March 9, 1954    L. E. MARCHANT ET AL    2,671,233
MACHINE TOOL WITH AUTOMATICALLY INDEXABLE ROTARY TABLE
Filed March 29, 1951    3 Sheets-Sheet 2
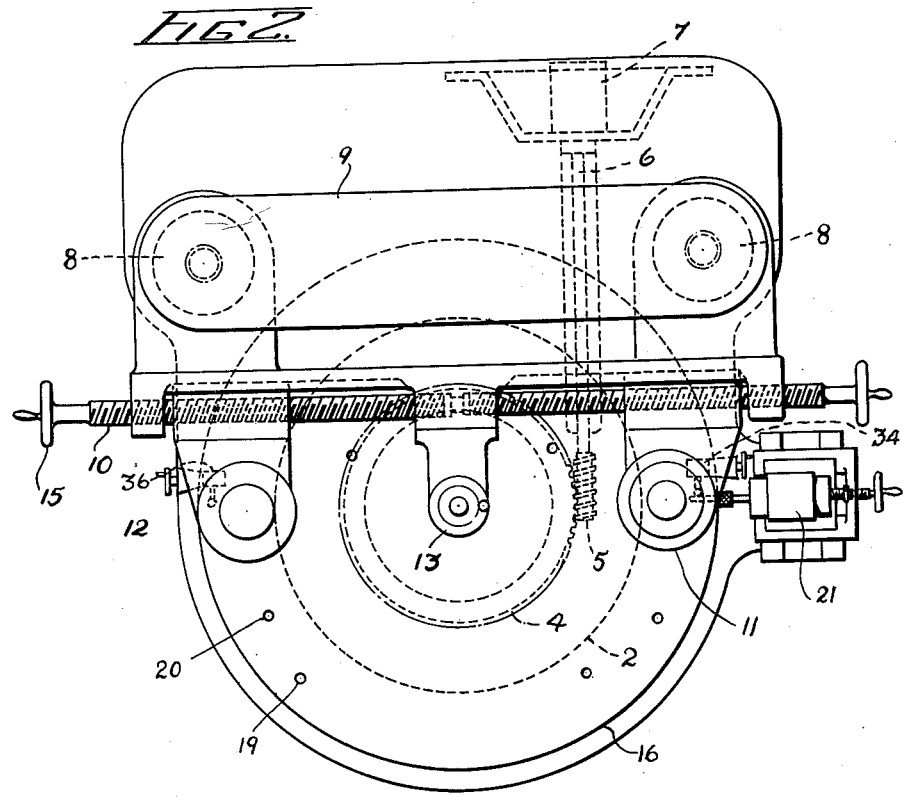
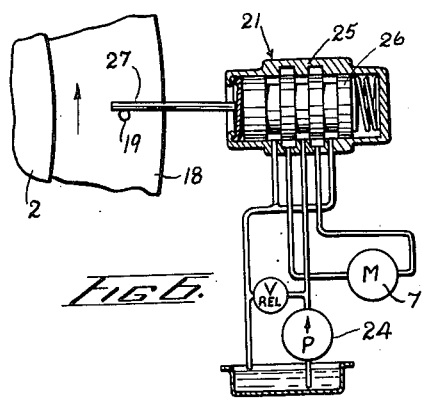
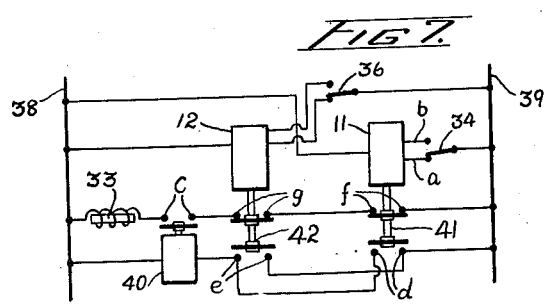
INVENTORS
L.E.MARCHANT
C.P.FARR
PER
ATTORNEY March 9, 1954    L. E. MARCHANT ET AL    2,671,233
MACHINE TOOL WITH AUTOMATICALLY INDEXABLE ROTARY TABLE
Filed March 29, 1951            3 Sheets-Sheet 3
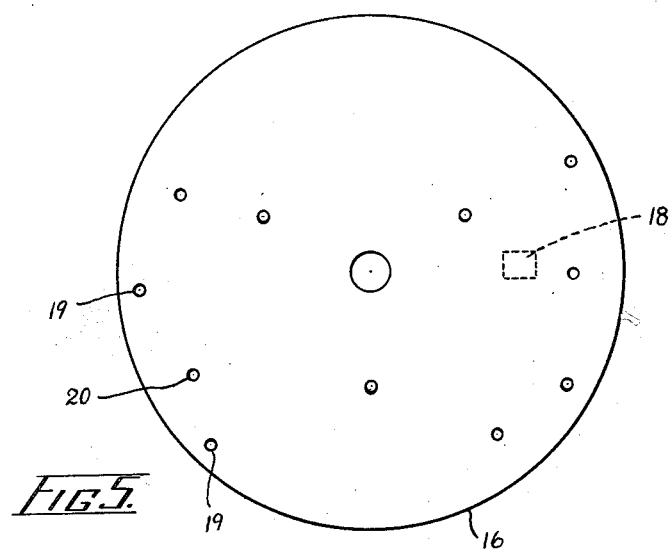
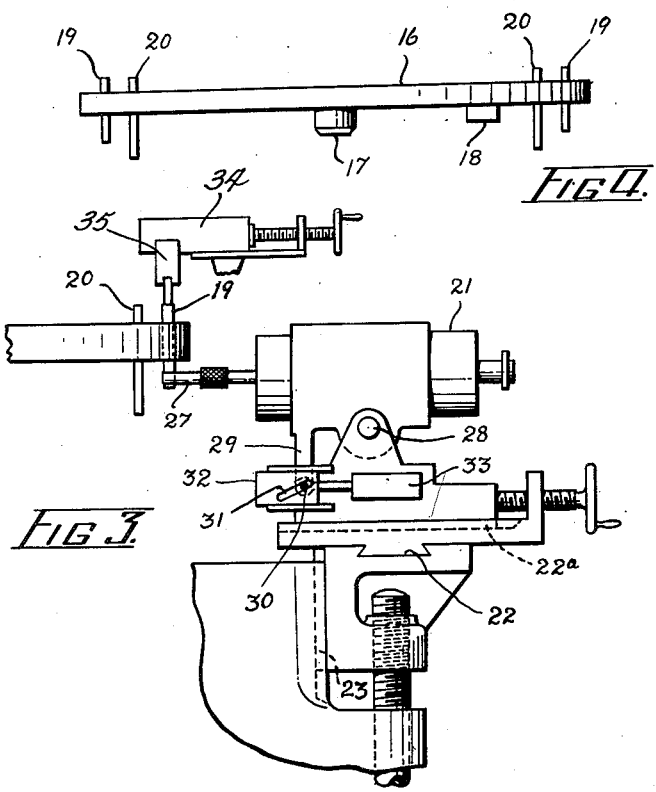
INVENTORS
L.E.MARCHANT
C.P.FARR
PER
ATTORNEY Patented Mar. 9, 1954

2,671,233

UNITED STATES PATENT OFFICE 2,671,233

MACHINE TOOL WITH AUTOMATICALLY INDEXABLE ROTARY TABLE

Lawrence Edgar Marchant, Toronto, Ontario, and Clifford Phoenix Farr, Swansea, Ontario, Canada, assignors to A. V. Roe Canada Limited, Malton, Ontario, Canada, a corporation Application March 29, 1951, Serial No. 218,126

7 Claims. (Cl. 10—128)

This invention relates to machine tools, and more particularly to machine tools of the kind having a rotary table for supporting a workpiece, and having means for indexing the table relatively to one or more tool heads to enable the same machine operations to be performed at different points on the workpiece, or on a series of separate workpieces mounted on the table.

Numerous constructions of such machines have been proposed and in many of them the table is adapted to be stopped in an index position by means of a plunger and socket locating mechanism on the table and frame of the machine. To overcome the shock and wear inherent in such constructions, various systems of power drive for the table and of control have been proposed for bringing the table slowly to rest at an index station in conjunction with the aforementioned plunger and socket locating mechanism. However, heretofore known constructions are complicated and cannot readily be altered to vary the positions at which the table is brought to rest at an index station.

The main object of the present invention is to provide a machine tool having a rotary table, in which a simple control stops the table accurately at an index station without the use of a plunger and socket type locating mechanism. In accordance with the invention the control is actuated by a simple readily changeable index member which can easily be made up to suit the particular workpiece or workpieces which it is desired to machine.

A further object of the invention is to provide a machine tool having an indexable rotary table which also automatically brings the tool heads into operation.

The invention is more particularly described with reference to the accompanying drawings, in which like reference characters designate corresponding parts throughout the several views, and in which:

Fig. 2 is a plan view of the said machine;

Fig. 3 is an enlarged view of a portion of Fig. 1, illustrating particularly a construction of the control for stopping the table;

Fig. 4 is a side elevational view of an index member constructed in accordance with the invention;

Fig. 5 is a plan view of the index member;

Fig. 6 is a diagram illustrating the hydraulic system of the machine; and

Fig. 7 is a diagram illustrating the electrical circuit of the machine.

Figure 1:
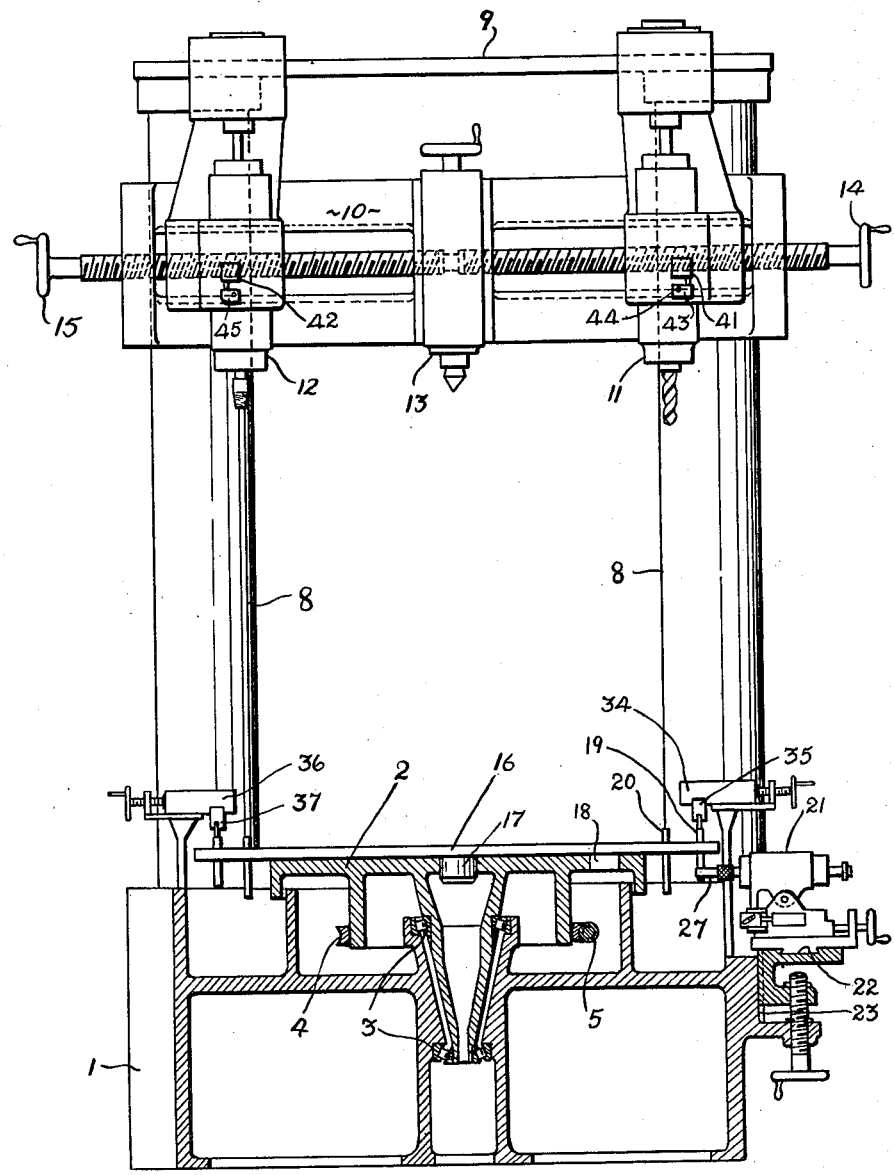
Fig. 1 is a front elevational view, partly in section, of a drilling and tapping machine which embodies the present invention.

Referring to the drawings, a machine in which the invention may be incorporated comprises a base or frame 1 on which a table 2 is mounted on suitable bearings 3 for rotation in a horizontal plane. To the table 2 is secured a gear wheel 4, which is concentric with the bearings 3 and which meshes with a worm gear 5 mounted on and driven by a shaft 6 which is journalled in bearings in the base 1. The shaft 6 is connected to and driven by a reversible hydraulic motor 7.

Extending upwardly from the base 1 and secured thereto are two columns 8 connected at the top by a bridge 9. The columns 8 constitute slideways for a crosspiece 10 which is adapted to be raised and lowered thereon by means of motor-driven lead screws, in accordance with normal machine tool practice. On the cross-piece 10 are slidably mounted tool heads 11 and 12 having rotary tool spindles reciprocable towards and away from the table to perform machining operations; also, a work centre 13 is secured to the crosspiece, the axis of the said work centre coinciding with the axis of rotation of the worktable 2. The tool heads 11 and 12 are adapted to be positioned on the crosspiece 10 by means of lead screws rotatable by handwheels 14 and 15 respectively. The tool heads 11 and 12 may be drilling and tapping heads respectively, each incorporating an automatic drive and feed for its tool spindle, controlled in a manner hereinafter described.

Mounted on the table 2 is an index member 16 which is best illustrated in Figs. 4 and 5. The index member comprises a circular plate of larger diameter than the table 2, and has in its underside a spigot 17 adapted to register in and engage a bore in the centre of the table. A driving key 18 on the underside of the index member fits a keyway in the upper surface of the table 2 to provide a driving engagement between the table and index member. A plurality of holes are drilled in the index member adjacent its periphery, the holes being arranged in rings which are concentric with the index member. Pins 19 are inserted in the holes in the outermost ring and project on both sides of the index member, whilst longer pins 20 are inserted in the next ring and project on the underside of the index member by a greater distance than the pins 19; the pins constitute abutments which co-operate with the motor control 21 as will be hereinafter described. A workpiece or workpieces may be clamped to the index member 16 in any convenient manner.

The control 21 is mounted adjacent the table 2 on horizontal slideways 22 and 22ª and on a vertical slideway 23 provided on the base so that the position of the control can be adjusted both horizontally and vertically. As shown in Fig. 6, the control comprises a fluid control valve interposed in the fluid pressure and return lines between a hydraulic pump 24 and the hydraulic motor 7 which drives the table 2. The control includes a ported cylinder 25 in which is provided a spring-pressed spool 26 which controls the supply of fluid from the pump to the motor. The position of the spool in the cylinder is varied by the lateral deflection of a displaceable element 27. With the control positioned as shown in the drawings, the element 27 is adapted to be displaced by the pins 19 on the index member 16 as the motor 7 drives the table 2. In the position shown in Fig. 6, the element 27 has been displaced laterally to a neutral position by a pin 19 so that the spool 26 has cut off the supply of fluid to the motor 7 to stop the motor. However, because of the inertia of the moving parts, the motor 7 and the table 2 will not come to a sudden stop but will tend to overrun, thereby causing a further displacement of the element 27 which moves the spool further to the right, reversing the flow of fluid to the motor 7 and the direction of rotation of the table 2. After a brief hunting motion the table and workpieces secured to it are accurately indexed to a position controlled by the pin 19. As is hereinafter described, one or both of the tool heads are then energized and a machining operation is performed on the workpieces. Briefly, the motor control 21 can be described as being of the kind having a displaceable element 27 normally urged to a position at which the control is conditioned to cause the motor 7 to turn in one sense, the element 27 if displaced from the said position to a neutral position conditioning the control to stop the motor and the element if further displaced from the said neutral position conditioning the control to cause the motor to turn in the opposite sense.

In order that rotation of the table may be reinstituted once the machining operation has been performed, the control 21 is arranged to pivot about a bearing 28, as best shown in Fig. 3. A lug 29 depends from one end of the control casing, and extending from the lug a pin 30 engages an inclined cam slot 31 in a slide 32 which is horizontally displaceable in a slideway. The position of the slide 32 and hence of the control 21, is governed by a solenoid 33: when the solenoid is un-energized, the slide is at the position shown and the control is substantially horizontal; when the solenoid is energized, the slide moves to the right and the pin 30 moves vertically, thus tilting the control 21. When the control is tilted, the displaceable element 27 is disengaged from the pin 19 and the element 27 and spool 26 return to their normal position where fluid is once again permitted to flow from the pump 24 to the motor 7. The table 2 begins to rotate; and means hereinafter described open the circuit to the solenoid 33 and thus restore the control to the horizontal position after the pin 19 has moved sufficiently so that it does not immediately re-engage the element 27. The control is thus restored to a position where the element 27 will be displaced by the next pin 19 which comes into engagement with it, so that the rotation of the table is again stopped and a further machining operation takes place. By suitably locating the pins 19, successive machining operations can thus be automatically performed at desired places on the workpieces.

To initiate a drilling operation when the control 21 stops the table, a limit switch 34 is adjustably mounted adjacent the table 2 and has an arm 35 which is contacted and moved by the same pin 19 which engages the element 27. To initiate simultaneously a tapping operation, there is provided a similar limit switch 36 having an arm 37 which is contacted by another pin 19 to initiate the tapping operation, but for independent operation of the tool heads certain of the pins 19 may project a shorter distance above the index member 16 than others, and the switches 34 and 36 may be so positioned that only one of the switches is operated by the shorter pins.

Fig. 7, which is a schematic diagram illustrates how machining operations and tilting of the control 21 are achieved, the various components being shown in the diagram in the positions they assume when both spindles are retracted and the table 2 is rotating. The limit switch 34 is a two position switch connected in series with the drilling head mechanism across supply lines 38 and 39. In the position shown, the switch 34 is connected to the drill head mechanism through a line $a$, and the mechanism thereby becomes conditioned for automatic operation. When a pin 19 engages the displaceable element 27 of the control 21, thus stopping the table, the arm 35 of the switch 34 is moved to the line $b$ and an automatic operation of the drill head is performed, the spindle moving downwardly and drilling a hole and then being retracted by an automatic mechanism known in the art. The limit switch 36 and tapping head mechanism are similarly connected across the lines 38 and 39 and operate in a similar manner, the spindle of the tapping head moving downwardly to tap a hole previously drilled by the drill head.

In parallel with the circuits through the limit switches 34 and 36 to the drill head and tapping head respectively is a circuit to the solenoid 33 of the control 21 and another circuit to the actuating mechanism of a normally open delayed break switch 40, the contacts $c$ of which are in the solenoid circuit. In series with the delayed break switch mechanism are parallel pairs of normally open contacts $d$ and $e$, and in series with the contacts $c$ in the circuit to the solenoid 33 are serially arranged normally closed contacts $f$ and $g$. A limit switch 41 is adapted to open the contacts $f$ and close the contacts $d$, and a similar limit switch 42 is adapted to open the contacts $g$ and close the contacts $e$. Referring to Fig. 1, the switch 41 is seen to be mounted on the drill head 11 and is actuated by a cam 43 pivotally mounted at 44 on the drill head. The cam is coupled by gearing to the tool spindle and is rotated through say 15° when the spindle moves downwardly to perform a drilling operation, and returns to its original normal position when the spindle rises from the workpiece; the contacts f are therefore opened and the contacts d are closed during a drilling operation. The limit switch 42 and a cam 45 are similarly mounted on the tapping head 12 so that the contacts g are opened and the contacts e are closed during a tapping operation. During each machining operation, therefore, the delayed break switch is energized and the contacts c are closed, but since the contacts f and g are also in series with the delayed break switch, the solenoid 33 will not energize until after both the drill head and the tapping head have returned to their normal retracted positions and have caused the switches 41 and 42 to close the contacts f and g. The delayed break switch 40 is so adjusted that after being de-energized by the retraction of the tool heads it does not re-open the contacts c until a predetermined time has elapsed, during which time the machining operations are compelted and the pin 19 previously in engagement with the displaceable element 27 of the control 21 has moved to a position where it is no longer engageable with the displaceable element.

The operation of the machine for drilling will now be described. One or more workpieces are clamped on the index member 16 which has been provided with pins for stopping the table 2 in predetermined positions for machining the workpieces, the index member in turn is clamped to the table 2, and the drill head 11 is moved to the desired location. The motor 7 is started and the table 2 rotates until the lower end of a pin 19 contacts the element 27 of the control 21 and the supply of fluid to the motor 7 is thus cut off. The upper end of the same pin 19 also contacts the arm 35 of limit switch 34 and closes the circuit to line b of the drill head, thereby initiating downward movement of the tool spindle of the drill head. As the tool spindle moves downwardly the cam 43 causes contacts f of the limit switch 41 to open and close contacts d in the circuit to the delayed break switch 40. The energization of the delayed break switch 40 closes contacts c in the circuit to the solenoid 33 and the said contacts remain closed for an interval of time sufficient for the complete cycle of operations to be performed. When the drilling operation has been completed, the tool spindle automatically returns to its retracted position and thus causes contacts f to close and completes the circuit to the solenoid 33 of the control 21, whereupon the control is tilted to remove the element 27 from contact with pin 19. The element 27 moves to its normal position and the control recommences the rotation of the table 2. The upper end of the pin 19 moves away from the limit switch 34 which returns to its original position closing the circuit to line a of the drill head so as to again condition the mechanism for the next drilling operation. The delayed break switch 40 opens the contacts c after a predetermined time so that the control 21 is restored to its horizontal position.

The operation of the tapping head is similar to that of the drill head and need not be described in detail.

After the machining operations controlled by the pins 19 have been completed, the positions of the control 21 and of the switches 34 and 36 may be adjusted so that they are actuated by the next ring of pins 20. When corresponding adjustments of the positions of the tool heads 11 and 12 have been made, another cycle of machining operations may be performed.

Whilst drilling and tapping operations have been described, it will be realized that other machining operations such as counterboring or milling may be performed by tools carried by suitable heads incorporating their own automatic drives and feeds. In addition, a number of tool heads may be used, each having corresponding limit switches adapted to be operated by a pin or abutment member on the index member.

It is to be understood that the form of the invention herewith shown and described is to be taken as a preferred example of the same, and that various changes in the shape, size and arrangements of the parts may be resorted to, without departing from the scope of the claims.

What we claim as our invention is:

1. An automatic machine tool comprising a frame, a table rotatably mounted on the frame and adapted to support a workpiece, a reversible motor for rotating the table in two senses, a control for the said reversible motor of the kind having a displaceable element normally urged to a position at which the control is conditioned to cause the motor to turn in one sense, the element if displaced from the said position to a neutral position conditioning the control to stop the motor and the element if further displaced from the said neutral position conditioning the control to cause the motor to turn in the opposite sense, a tool head mounted on the frame and having a rotary tool spindle reciprocable towards and away from the table to perform a matching operation, an interchangeable index member, a mounting for the rotation of the index member in synchronism with the table, pins adjustably mounted in holes arranged in a circle on the index member and adapted to engage the displaceable element of the control to stop the table, means operable by the tool spindle at the end of its retracting stroke to disengage the displaceable element from an engaged pin after completion of a machining operation, and activating means operable by said abutments for initiating the automatic operation of the tool head.

2. An automatic machine tool comprising a frame, a table rotatably mounted on the frame and adapted to support a workpiece, a reversible motor for rotating the table in two senses, a motor-activating control pivotally mounted on the frame and of the kind having a displaceable element normally urged to a position at which the control is conditioned to cause the motor to turn in one sense, the element if displaced from the said position by a predetermined amount conditioning the control to stop the motor and the element if displaced from the said position by an amount greater than the predetermined amount conditioning the control to cause the motor to turn in the opposite sense, a tool head mounted on the frame and having a rotary spindle reciprocable towards and away from the table to perform a machining operation, an interchangeable index member mounted for rotation in synchronism with the table, abutments on the index member adapted successively to engage the displaceable element of the control, the said abutments being so located and spaced on the index member that they successively displace the element by the predetermined amount when the table is at selected positions with respect to the tool head, means operable by the tool spindle at the end of its retracting stroke to tilt the control on its pivot to disengage the displaceable element from an engaged abutment after completion of a machining operation, and activating means operable by said abutments for initiating the automatic operation of the tool head.

3. An automatic machine tool comprising a frame, a table rotatably mounted on the frame, a motor for rotating the table, a tool head mounted on the frame and having a rotary tool spindle reciprocable towards and away from the table to perform a machining operation, a motor control tiltably mounted on the frame, the control having a displaceable element normally urged to a position at which the control is conditioned to cause the motor to operate and the element if displaced from the said position by a predetermined amount conditioning the control to stop the motor, a block slidably mounted on the frame and having an inclined cam slot, a positioning pin on the control engaging in the said slot, a solenoid in an electrical circuit and having an armature connected to the block to translate the block and thus tilt the control when the solenoid is energized, an interchangeable index member coupled to the table for rotation in synchronism therewith, abutments on the index member adapted successively to engage the displaceable element of the control, the said abutments being so located and spaced on the index member that they successively displace the element by the predetermined amount when the table is at selected positions with respect to the tool head, and means operable by the spindle after it has performed a machining operation to close the circuit to the solenoid thereby tilting the control and disengaging the displaceable element from an engaged abutment.

4. An automatic machine tool comprising a frame, a table rotatably mounted on the frame and adapted to support a workpiece, a reversible motor for rotating the table in two senses, an interchangeable index member, a mounting for the rotation of the index member in synchronism with the table, a plurality of groups of abutments on the index member, the abutments in each group being of the same effective lengths and the groups of abutments being of different effective lengths, a selectively positionable control for the said reversible motor of the kind having a displaceable element normally urged to a position at which the control is conditioned to cause the motor to turn in one sense, the element if displaced from the said position to a neutral position conditioning the control to stop the motor and the element if further displaced from the said neutral position conditioning the control to cause the motor to turn in the opposite sense, the displaceable element of the control being adapted, when the control is at a selected position, to be engaged by the abutments of at least one group to stop the table, and being adapted, when the control is at other selected positions, to be engaged by the abutments of other groups to stop the table, a plurality of automatic tool heads mounted on the frame and having rotary tool spindles reciprocable towards and away from the table to perform machining operations, means operable by a tool spindle at the end of its retracting stroke to disengage the displaceable element from an engaged abutment after completion of a machining operation, and activating means selectively operable by said abutments for initiating the automatic operation of each tool head.

5. An automatic machine tool comprising a frame, a table rotatably mounted on the frame, a reversible motor for rotating the table in two senses, a tool head mounted on the frame and having a rotary tool spindle reciprocable towards and away from the table to perform a machining operation, a control for the said motor tiltably mounted on the frame, the control being of the kind having a displaceable element normally urged to a position at which the control is conditioned to cause the motor to turn in one sense, the element if displaced from the said position to a neutral position conditioning the control to stop the motor and the element if further displaced from the said neutral position conditioning the control to cause the motor to turn in the opposite sense, an interchangeable index member coupled to the table for rotation in synchronism therewith, abutments on the index member adapted successively to engage the displaceable element of the control, the said abutments being so located and spaced on the index member that they successively displace the element to the neutral position to stop the table when the table is at selected positions with respect to the tool head, means to tilt the control to disengage the displaceable element from an engaged abutment including a solenoid in an electrical circuit and which tilts the control when energized, and means operable by the spindle after it has performed a machining operation to energize the solenoid.

6. An automatic machine tool comprising a frame, a table rotatably mounted on the frame, a reversible motor for rotating the table in two senses, a tool head mounted on the frame and having a rotary tool spindle reciprocable towards and away from the table to perform a machining operation, a control for the said motor tiltably mounted on the frame, the control being of the kind having a displaceable element normally urged to a position at which the control is conditioned to cause the motor to turn in one sense, the element if displaced from the said position to a neutral position conditioning the control to stop the motor, and the element if further displaced from the said neutral position conditioning the control to cause the motor to turn in the opposite sense, an interchangeable index member coupled to the table for rotation in synchronism therewith, abutments on the index member adapted successively to engage the displaceable element of the control, the said abutments being so located and spaced on the index member that they successively displace the element to the neutral position to stop the table when the table is at selected positions with respect to the tool head, a block slidably mounted on the frame and having an inclined cam slot, a positioning pin on the control engaging in the said slot, power means connected to the block and adapted when energized to translate the block thereby tilting the control to disengage the displaceable element from an engaged abutment, and means operable by a spindle after it has performed a machining operation to energize the power means.

7. An automatic machine tool comprising a frame, a table rotatably mounted on the frame and adapted to support a workpiece, a reversible motor for rotating the table in two senses, a control for the said reversible motor of the kind having a displaceable element normally urged to a position at which the control is conditioned to cause the motor to turn in one sense, the element if displaced from the said position to a neutral position conditioning the control to stop the motor and the element if further displaced from the said neutral position conditioning the control to cause the motor to turn in the opposite sense, an automatic tool head mounted on the frame and having a rotary tool spindle reciprocable towards and away from the table to form a machining operation, an interchangeable index member, a mounting for the rotation of the index member in synchronism with the table, abutments on the index member adapted to engage the displaceable element of the control to stop the table, means operable by the tool spindle at the end of its retracting stroke to disengage the displaceable element from an engaged abutment after completion of a machining operation, and activating means operable by said abutments for initiating the automatic operation of the tool head.

LAWRENCE EDGAR MARCHANT.
CLIFFORD PHOENIX FARR.

References Cited in the file of this patent

UNITED STATES PATENTS

| Number | Name | Date |
| --- | --- | --- |
| 1,906,387 | Lovejoy | May 2, 1933 |
| 1,911,025 | Lovejoy | May 23, 1933 |